United States Patent
Sato

(10) Patent No.: US 10,061,222 B2
(45) Date of Patent: Aug. 28, 2018

(54) COIL SPRING, COIL SPRING HOLDER, AND IMAGE FORMING APPARATUS

(71) Applicant: Yuki Sato, Kanagawa (JP)

(72) Inventor: Yuki Sato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/486,263

(22) Filed: Apr. 12, 2017

(65) Prior Publication Data

US 2017/0307996 A1    Oct. 26, 2017

(30) Foreign Application Priority Data

Apr. 21, 2016    (JP) .................................. 2016-085415

(51) Int. Cl.
| | |
|---|---|
| G03G 15/02 | (2006.01) |
| F16F 1/12 | (2006.01) |
| F16F 1/04 | (2006.01) |
| F16F 1/06 | (2006.01) |

(52) U.S. Cl.
CPC ......... *G03G 15/0233* (2013.01); *F16F 1/047* (2013.01); *F16F 1/06* (2013.01); *F16F 1/123* (2013.01); *F16F 1/125* (2013.01); *F16F 2232/08* (2013.01); *F16F 2238/026* (2013.01)

(58) Field of Classification Search
CPC ........ G03G 15/0233; F16F 1/06; F16F 1/047; F16F 1/125; F16F 1/123; F16F 2238/026; F16F 2232/08

USPC ................................................... 399/115, 174
See application file for complete search history.

(56) References Cited

U.S. PATENT DOCUMENTS

| | | | | |
|---|---|---|---|---|
| 5,503,375 A | * | 4/1996 | Balsells ................. | F16F 1/045 267/167 |
| 7,055,812 B2 | * | 6/2006 | Balsells ................. | F16F 1/045 267/166 |
| 2014/0356021 A1 | | 12/2014 | Sato | |

FOREIGN PATENT DOCUMENTS

| | | |
|---|---|---|
| JP | 8-105476 | 4/1996 |
| JP | 2004-301118 | 10/2004 |
| JP | 2014-235267 | 12/2014 |

\* cited by examiner

*Primary Examiner* — Billy Lactaoen
(74) *Attorney, Agent, or Firm* — Duft Bornsen & Fettig LLP

(57) ABSTRACT

A coil spring includes a resilient portion having a first diameter defined by a first central axis that is hypothetical and an end coil abutting on one end of the resilient portion in an axial direction of the resilient portion. The end coil has a second diameter defined by a second central axis that is hypothetical and shifted from the first central axis of the resilient portion in parallelism with the first central axis of the resilient portion by a predetermined shift amount. A coupler has a first width that is smaller than the first diameter of the resilient portion and greater than a second width obtained by subtracting the predetermined shift amount from the first diameter of the resilient portion. The coupler is inserted into the end coil to secure the end coil to the coupler.

15 Claims, 7 Drawing Sheets

FIG. 8A
FIG. 8B
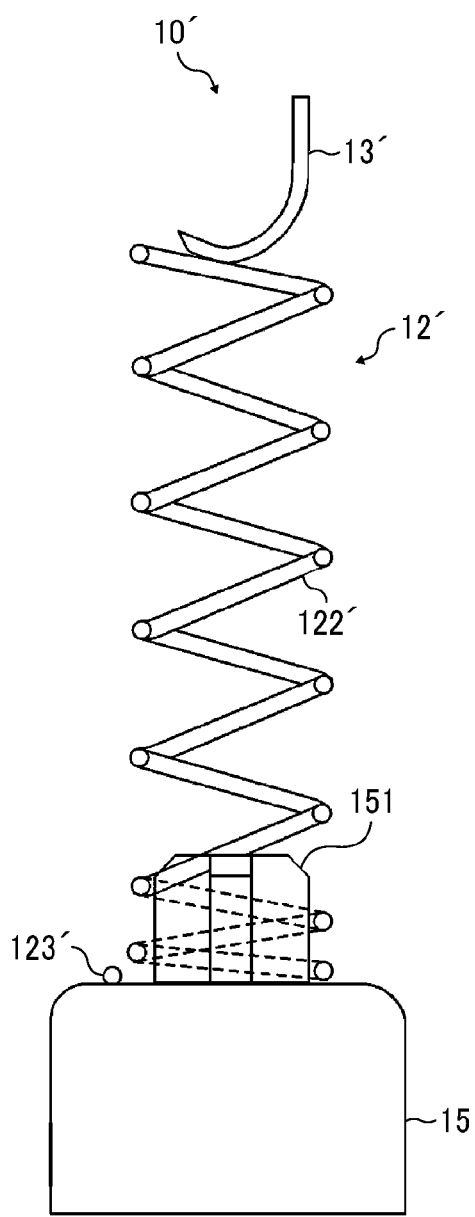
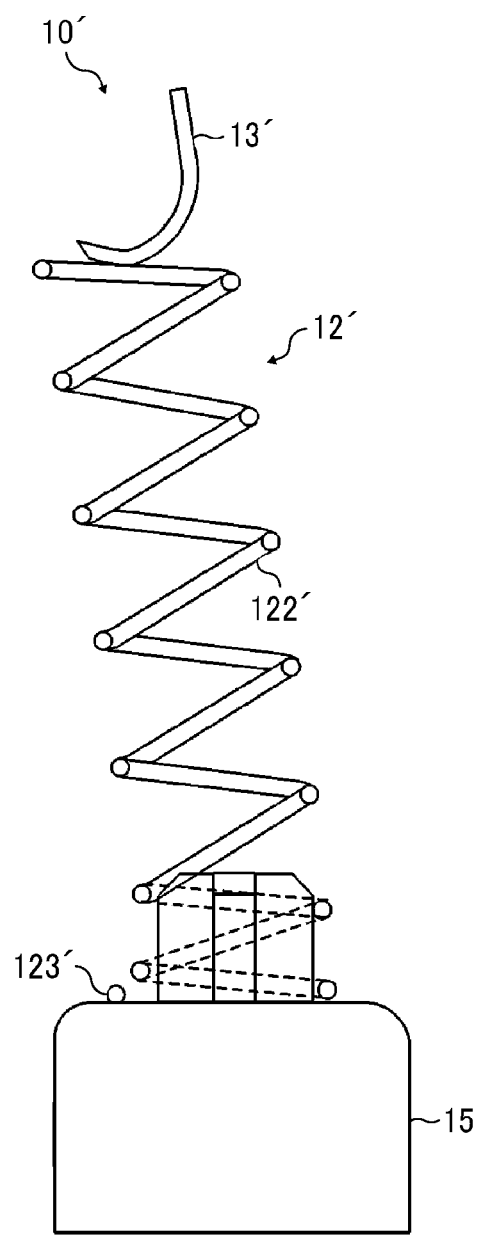

COIL SPRING, COIL SPRING HOLDER, AND IMAGE FORMING APPARATUS

CROSS-REFERENCE TO RELATED APPLICATION

This patent application is based on and claims priority pursuant to 35 U.S.C. § 119 to Japanese Patent Application No. 2016-085415, filed on Apr. 21, 2016, in the Japanese Patent Office, the entire disclosure of which is hereby incorporated by reference herein.

BACKGROUND

Technical Field

Exemplary embodiments generally relate to a coil spring, a coil spring holder, and an image forming apparatus, and more particularly, to a coil spring, a coil spring holder for supporting the coil spring, and an image forming apparatus for forming an image on a recording medium.

Background Art

Related-art image forming apparatuses, such as copiers, facsimile machines, printers, and multifunction printers having two or more of copying, printing, scanning, facsimile, plotter, and other functions, typically form an image on a recording medium according to image data. Thus, for example, a charger uniformly charges a surface of a photoconductor; an optical writer emits a light beam onto the charged surface of the photoconductor to form an electrostatic latent image on the photoconductor according to the image data; a developing device supplies toner to the electrostatic latent image formed on the photoconductor to render the electrostatic latent image visible as a toner image; the toner image is directly transferred from the photoconductor onto a recording medium or is indirectly transferred from the photoconductor onto a recording medium via an intermediate transfer belt; finally, a fixing device applies heat and pressure to the recording medium bearing the toner image to fix the toner image on the recording medium, thus forming the image on the recording medium.

Such image forming apparatus and a moving part of a mechanism such as a suspension of an automobile may include a coil spring. The coil spring may be supported by a holder with an insert inserted into the coil spring so that the holder is combined with the coil spring to hold the coil spring.

SUMMARY

This specification describes below an improved coil spring. In one exemplary embodiment, the coil spring includes a resilient portion having a first diameter defined by a first central axis that is hypothetical and an end coil abutting on one end of the resilient portion in an axial direction of the resilient portion. The end coil has a second diameter defined by a second central axis that is hypothetical and shifted from the first central axis of the resilient portion in parallelism with the first central axis of the resilient portion by a predetermined shift amount. A coupler has a first width that is smaller than the first diameter of the resilient portion and greater than a second width obtained by subtracting the predetermined shift amount from the first diameter of the resilient portion. The coupler is inserted into the end coil to secure the end coil to the coupler.

This specification further describes an improved coil spring holder. In one exemplary embodiment, the coil spring holder includes a coil spring and a holder. The coil spring includes a resilient portion having a first diameter defined by a first central axis that is hypothetical and an end coil abutting on one end of the resilient portion in an axial direction of the resilient portion. The end coil has a second diameter defined by a second central axis that is hypothetical and shifted from the first central axis of the resilient portion in parallelism with the first central axis of the resilient portion by a predetermined shift amount. A coupler has a first width that is smaller than the first diameter of the resilient portion and greater than a second width obtained by subtracting the predetermined shift amount from the first diameter of the resilient portion. The coupler is inserted into the end coil to secure the end coil to the coupler. The holder mounts the coupler of the coil spring to support the coil spring.

This specification further describes an improved image forming apparatus. In one exemplary embodiment, the image forming apparatus includes a charger and a coil spring holder to contact the charger. The coil spring holder includes a coil spring and a holder. The coil spring includes a resilient portion having a first diameter defined by a first central axis that is hypothetical and an end coil abutting on one end of the resilient portion in an axial direction of the resilient portion. The end coil has a second diameter defined by a second central axis that is hypothetical and shifted from the first central axis of the resilient portion in parallelism with the first central axis of the resilient portion by a predetermined shift amount. A coupler has a first width that is smaller than the first diameter of the resilient portion and greater than a second width obtained by subtracting the predetermined shift amount from the first diameter of the resilient portion. The coupler is inserted into the end coil to secure the end coil to the coupler. The holder mounts the coupler of the coil spring to support the coil spring.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 8A is a cross-sectional view of a comparative spring holder including a spring and a tip portion; and FIG. 8B is a cross-sectional view of the comparative spring holder depicted in FIG. 8A, illustrating deformation of the spring.

Figure 1:
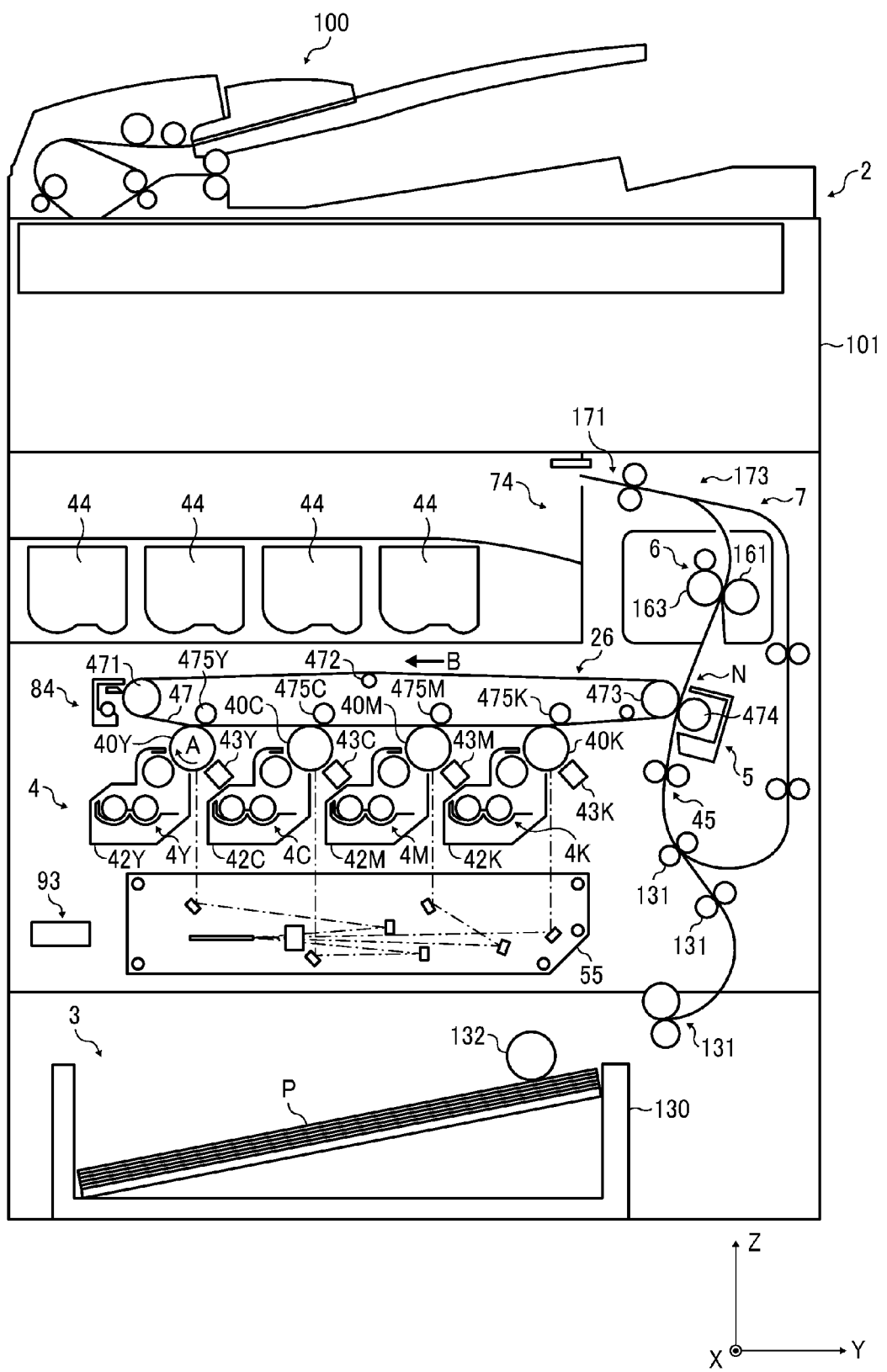
FIG. 1 is a schematic vertical cross-sectional view of an image forming apparatus according to an exemplary embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION OF THE DISCLOSURE

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Referring now to the drawings, wherein like reference numerals designate identical or corresponding parts throughout the several views, particularly to FIG. 1, an image forming apparatus 100 according to an exemplary embodiment is explained.

The image forming apparatus 100 may be a copier, a facsimile machine, a printer, a multifunction peripheral or a multifunction printer (MFP) having at least one of copying, printing, scanning, facsimile, and plotter functions, or the like. According to this exemplary embodiment, the image forming apparatus 100 is a color copier that forms a color toner image on a recording medium by electrophotography. Alternatively, the image forming apparatus 100 may be a monochrome copier that forms a monochrome toner image on a recording medium.

FIG. 1 is a schematic vertical cross-sectional view of the image forming apparatus 100. As illustrated in FIG. 1, the image forming apparatus 100 includes an image forming device 4, constructed of four process units 4Y, 4C, 4M, and 4K, that forms a toner image on a sheet P serving as a recording medium and a sheet feeder 3 that supplies the sheet P to the image forming device 4.

Above the image forming device 4 are four toner cartridges 44 and a reading device 2. Each of the toner cartridges 44 serves as a unit that contains toner serving as a developer. The reading device 2 serves as a scanner that reads an image on an original.

Inside a frame 101 of the image forming apparatus 100 are a transfer unit 26 and an optical scanner 55. The transfer unit 26, serving as a primary transferor, includes an intermediate transfer belt 47 that is an endless belt serving as a transfer body. The transfer unit 26 primarily transfers yellow, cyan, magenta, and black toner images formed by the process units 4Y, 4C, 4M, and 4K, respectively, onto the intermediate transfer belt 47. The optical scanner 55, serving as an exposure device, is disposed in proximity to the image forming device 4.

Beside the transfer unit 26 is a transfer-convey device 5 serving as a secondary transferor that forms a secondary transfer nip N between the intermediate transfer belt 47 and the transfer-convey device 5. As the transfer-convey device 5 conveys the sheet P through the secondary transfer nip N, the transfer-convey device 5 secondarily transfers the yellow, cyan, magenta, and black toner images formed on the intermediate transfer belt 47 onto the sheet P, thus forming a color toner image on the sheet P.

An intermediate transfer belt cleaner 84 is disposed opposite the intermediate transfer belt 47 to clean the intermediate transfer belt 47 after the secondary transfer of the yellow, cyan, magenta, and black toner images.

Upstream from the transfer-convey device 5 in a sheet conveyance direction is a registration roller pair 45 that conveys the sheet P supplied from the sheet feeder 3 to the secondary transfer nip N at a predetermined time.

Downstream from the transfer-convey device 5 in the sheet conveyance direction is a fixing unit 6 that fixes the color toner image on the sheet P conveyed from the transfer-convey device 5.

Downstream from the fixing unit 6 in the sheet conveyance direction is an output device 7 that outputs the sheet P bearing the fixed color toner image conveyed from the fixing unit 6 onto an outside of the image forming apparatus 100.

An image formation controller 93, installed with a central processing unit (CPU), a non-volatile memory, and a volatile memory, serves as a controller that controls an operation of the components described above used to form the color toner image on the sheet P.

A detailed description is now given of a configuration of the reading device 2.

The reading device 2 irradiates the original with light. A charge coupled device (CCD) or a reading sensor such as a contact image sensor (CIS) receives the light reflected by the original and reads the light into RGB image data. The RGB image data is information defining a toner image to be formed on a sheet P and including the luminosity of each of red (R), green (G), and blue (B).

A detailed description is now given of a construction of the sheet feeder 3.

The sheet feeder 3 includes a paper tray 130 that loads a plurality of sheets P and a feed roller 132. The feed roller 132 is a tubular roller that contacts an uppermost sheet P of the plurality of sheets P placed on the paper tray 130 when the paper tray 130 is set inside the frame 101 of the image forming apparatus 100. As the feed roller 132 rotates, the feed roller 132 feeds the uppermost sheet P toward a plurality of conveyance roller pairs 131.

A detailed description is now given of a construction of the process units 4Y, 4C, 4M, and 4K.

The process units 4Y, 4C, 4M, and 4K include photoconductors 40Y, 40C, 40M, and 40K, that are drum-shaped, chargers 43Y, 43C, 43M, and 43K, developing devices 42Y, 42C, 42M, and 42K, and primary transfer rollers 475Y, 475C, 475M, and 475K, respectively. Each of the photoconductors 40Y, 40C, 40M, and 40K is a rotator or an image bearer rotatable clockwise in FIG. 1 in a rotation direction A. Each of the photoconductors 40Y, 40C, 40M, and 40K includes a surface photosensitive layer scanned and irradiated with light from the optical scanner 55 to form an electrostatic latent image.

The chargers 43Y, 43C, 43M, and 43K are disposed opposite the photoconductors 40Y, 40C, 40M, and 40K and upstream from the developing devices 42Y, 42C, 42M, and 42K, respectively, in the rotation direction A of the photoconductors 40Y, 40C, 40M, and 40K to charge an outer circumferential surface of the respective photoconductors 40Y, 40C, 40M, and 40K.

The developing devices 42Y, 42C, 42M, and 42K develop the electrostatic latent images formed on the photoconductors 40Y, 40C, 40M, and 40K into yellow, cyan, magenta, and black toner images, respectively. The primary transfer rollers 475Y, 475C, 475M, and 475K accommodated in the transfer unit 26 serve as primary transferors that primarily transfer the yellow, cyan, magenta, and black toner images formed on the photoconductors 40Y, 40C, 40M, and 40K, respectively, onto the intermediate transfer belt 47.

Each of the process units 4Y, 4C, 4M, and 4K further includes an electric potential sensor, for example, a surface electric potential sensor, serving as a surface electric potential detector that detects the surface electric potential of the respective photoconductors 40Y, 40C, 40M, and 40K. Thus, the process units 4Y, 4C, 4M, and 4K visualize the electrostatic latent images formed on the photoconductors 40Y, 40C, 40M, and 40K by the optical scanner 55 into the yellow, cyan, magenta, and black toner images, respectively.

The intermediate transfer belt 47 is looped over a driving roller 471, a driven roller 472, and a secondary transfer roller 473. The driving roller 471 is driven and rotated by a driver counterclockwise in FIG. 1, thus rotating the intermediate transfer belt 47 in a rotation direction B. The driven roller 472 and the secondary transfer roller 473 are rotated counterclockwise in FIG. 1 in a rotation direction identical to a rotation direction of the driving roller 471.

A detailed description is now given of a configuration of the transfer-convey device 5.

The transfer-convey device 5 includes a secondary transfer opposed roller 474 disposed opposite the secondary transfer roller 473 via the intermediate transfer belt 47. The secondary transfer opposed roller 474 contacts the intermediate transfer belt 47 at the secondary transfer nip N. As the secondary transfer opposed roller 474 and the secondary transfer roller 473 sandwich the intermediate transfer belt 47 and the sheet P at the secondary transfer nip N, the transfer-convey device 5 secondarily transfers the yellow, cyan, magenta, and black toner images formed on an outer circumferential surface of the intermediate transfer belt 47 onto the sheet P under a secondary transfer bias. The secondary transfer bias has an electric charge opposite an electrostatic charge that charges the outer circumferential surface of the intermediate transfer belt 47.

A detailed description is now given of a construction of the fixing unit 6.

The fixing unit 6 includes a heating roller 161 and a fixing roller 163. The heating roller 161 accommodates a heater. The heating roller 161 and the fixing roller 163 sandwich the sheet P and exert pressure to the sheet P. The fixing roller 163 presses against the heating roller 161 to form a fixing nip therebetween, where the fixing roller 163 and the heating roller 161 fix the color toner image on the sheet P. As the sheet P bearing the color toner image is conveyed through the fixing nip, the fixing roller 163 and the heating roller 161 fix the color toner image on a surface of the sheet P under heat and pressure. The heating roller 161 includes a tubular roller being made of aluminum, a silicone rubber layer coating the tubular roller, and a halogen heater being disposed inside the tubular roller and serving as a heater or a heat generator.

A detailed description is now given of a construction of the output device 7.

The output device 7 includes an output roller pair 171 constructed of two opposed rollers and a duplex unit 173 that reverses the sheet P ejected from the fixing unit 6 and conveys the sheet P to the registration roller pair 45 for duplex printing. The output device 7 further includes an internal output tray 74 defining a space interposed between the image forming device 4 and the reading device 2. The sheet P bearing the color toner image on one side or both sides of the sheet P is ejected onto the internal output tray 74.

The image forming apparatus 100 is an in-body paper ejection type image forming apparatus that has the internal output tray 74 as described above. Alternatively, the image forming apparatus 100 may have an external output tray attached to and projected from an outer cover of the image forming apparatus 100 so that the external output tray receives and stacks the sheet P ejected to the outside of the image forming apparatus 100.

A detailed description is now given of a construction of the image formation controller 93.

The image formation controller 93 includes a central processing unit (CPU), a main memory (MEM-P), a local memory (MEM-C), a hard disk (HD), a hard disk drive (HDD), a peripheral component interconnect (PCI) bus, and a network interface (I/F).

The CPU performs data processing and calculation according to a program stored in the main memory and controls an operation of the components of the image forming apparatus 100 described above. The main memory is a storage region of the image formation controller 93 that stores a program and data actuating various functions of the image formation controller 93. Alternatively, the program may be stored in a computer readable, recording medium, such as a compact disc read only memory (CD-ROM), a floppy disk (FD), a compact disc recordable (CD-R), and a digital versatile disc (DVD), in a file format installable or executable.

The local memory is used as an image buffer for copying and a code buffer. The HD is a storage that stores image data, font data used for printing, and form data. The HDD controls reading or writing of data with respect to the HD under control of the CPU. The network I/F sends and receives data to and from an external device such as a data processor via a communication network.

The image formation controller 93 serves as a communication controller that controls bidirectional communication with a host device (e.g., a client computer) via the communication network or the like. The image formation controller 93 also serves as an image data processor that sends image data from the host device to the optical scanner 55. A detailed description of an operation of the components of the image formation controller 93 is omitted.

Figure 2:
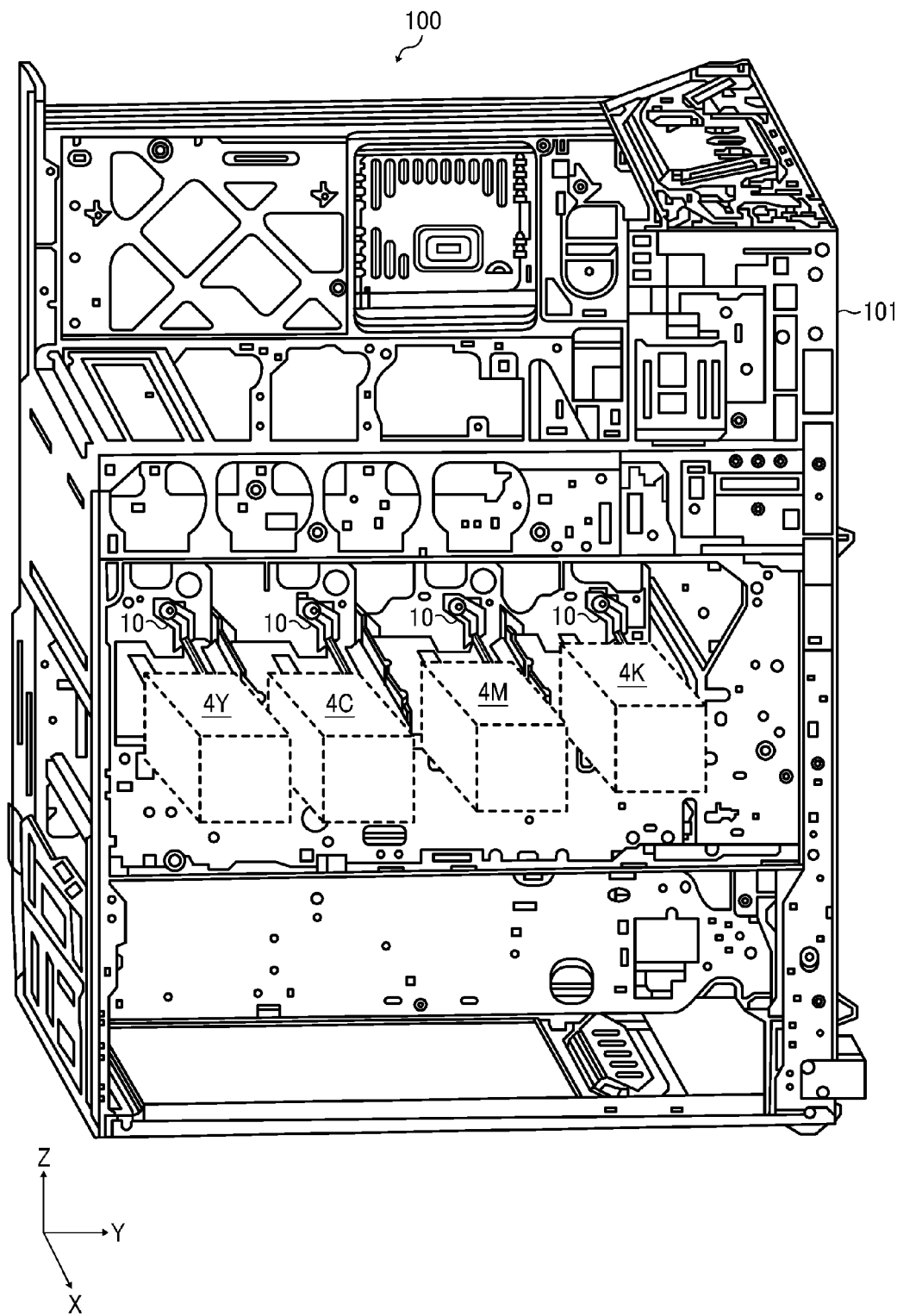
FIG. 2 is a perspective view of the image forming apparatus depicted in FIG. 1.

FIG. 2 is a perspective view of the image forming apparatus 100. As illustrated in FIG. 2, the frame 101 of the image forming apparatus 100 mounts four spring holders 10 serving as coil spring holders, respectively. The spring holders 10 are disposed at positions where the process units 4Y, 4C, 4M, and 4K are inserted to and removed from the frame 101, respectively. The spring holders 10 contact the chargers 43Y, 43C, 43M, and 43K depicted in FIG. 1 to create power supply paths through which power is supplied to the chargers 43Y, 43C, 43M, and 43K so that the chargers 43Y, 43C, 43M, and 43K apply a bias voltage to the photoconductors 40Y, 40C, 40M, and 40K, respectively.

Figure 3A:
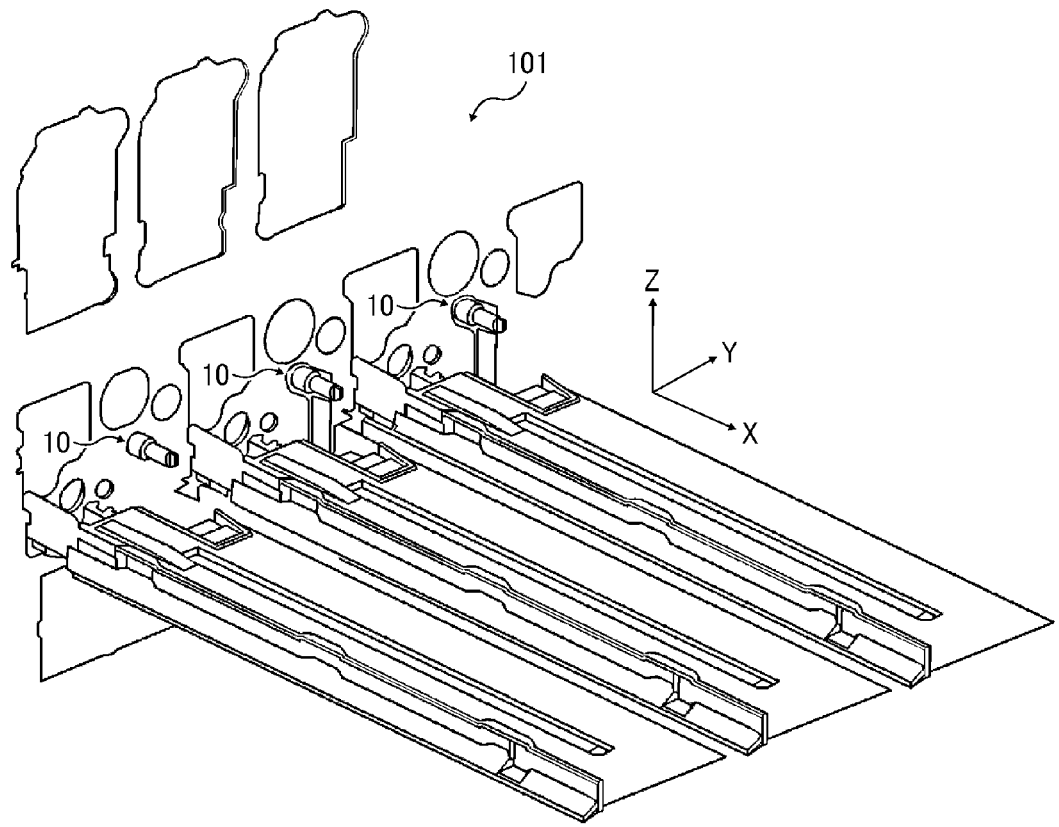
FIG. 3A is a perspective view of a frame and a plurality of spring holders incorporated in the image forming apparatus depicted in FIG. 1.

FIG. 3A is a perspective view of the frame 101 and the spring holders 10. As illustrated in FIG. 3A, the spring holders 10 are mounted on a rear wall of the frame 101, that is disposed relative to a front wall of the frame 101 in a direction X negatively. The spring holders 10 also serve as contacts that couple a power supply with the chargers 43Y, 43C, 43M, and 43K depicted in FIG. 1 to create a part of the power supply paths, respectively. FIG. 3A omits illustration of the chargers 43Y, 43C, 43M, and 43K.

According to this exemplary embodiment, the spring holders 10 are used to supply power from the power supply to the chargers 43Y, 43C, 43M, and 43K, respectively. Alternatively, the spring holders 10 may be used to support the developing devices 42Y, 42C, 42M, and 42K depicted in FIG. 1 or the like or to attain other purposes.

Figure 3B:
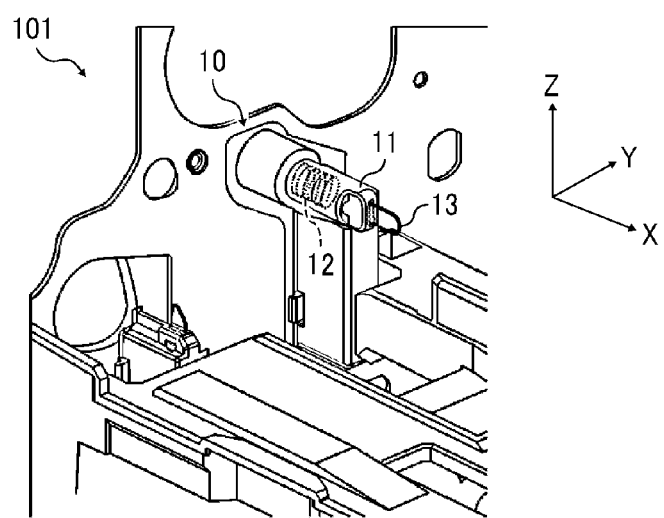
FIG. 3B is an enlarged perspective view of the frame and one of the spring holders depicted in FIG. 3A.

FIG. 3B is an enlarged perspective view of the frame 101 and the spring holder 10. As illustrated in FIG. 3B, the spring holder 10 includes a cover 11 serving as a part of a holder, a spring 12 covered by the cover 11 and subjected to expansion and contraction in the direction X, and a tip portion 13 mounted on a tip of the spring 12 in the direction X positively. As at least a part of the tip portion 13 is pressed in the direction X negatively in a state in which the tip portion 13 contacts a part of each of the chargers 43Y, 43C, 43M, and 43K, the spring holder 10 creates the power supply path through which power is supplied from the power supply to each of the chargers 43Y, 43C, 43M, and 43K.

Figure 4:
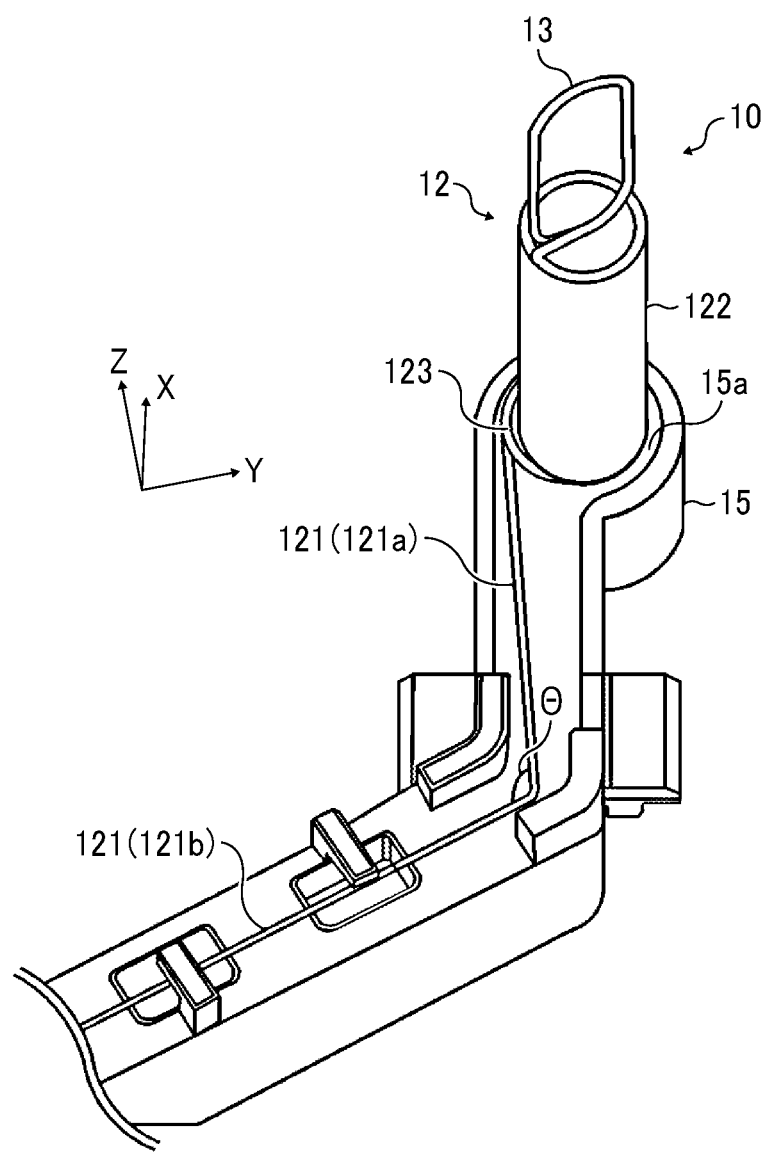
FIG. 4 is a perspective view of the spring holder depicted in FIG. 3B.

FIG. 4 is a perspective view of the spring holder 10 in a state in which the cover 11 depicted in FIG. 3B is removed. As illustrated in FIG. 4, the spring holder 10 further includes a holder 15. Although a detailed description of a construction of the spring 12 is deferred, the spring 12 is a coil spring that is substantially tubular. The spring 12 is a compression spring subjected to expansion and contraction linearly in the direction X positively and negatively. The spring 12 includes a foot 121 disposed at one end of the spring 12 in the direction X negatively. The foot 121 extends along the holder 15 and creates the power supply path.

According to this exemplary embodiment, the foot 121 includes a linear portion 121a and a tilt portion 121b. The linear portion 121a contacts a spring side face 15a of the holder 15, which is disposed opposite the spring 12 in the direction X positively. The linear portion 121a extends linearly in a direction Z negatively. The tilt portion 121b extends linearly from the linear portion 121a and is tilted relative to the linear portion 121a by a predetermined angle θ.

Figure 5:
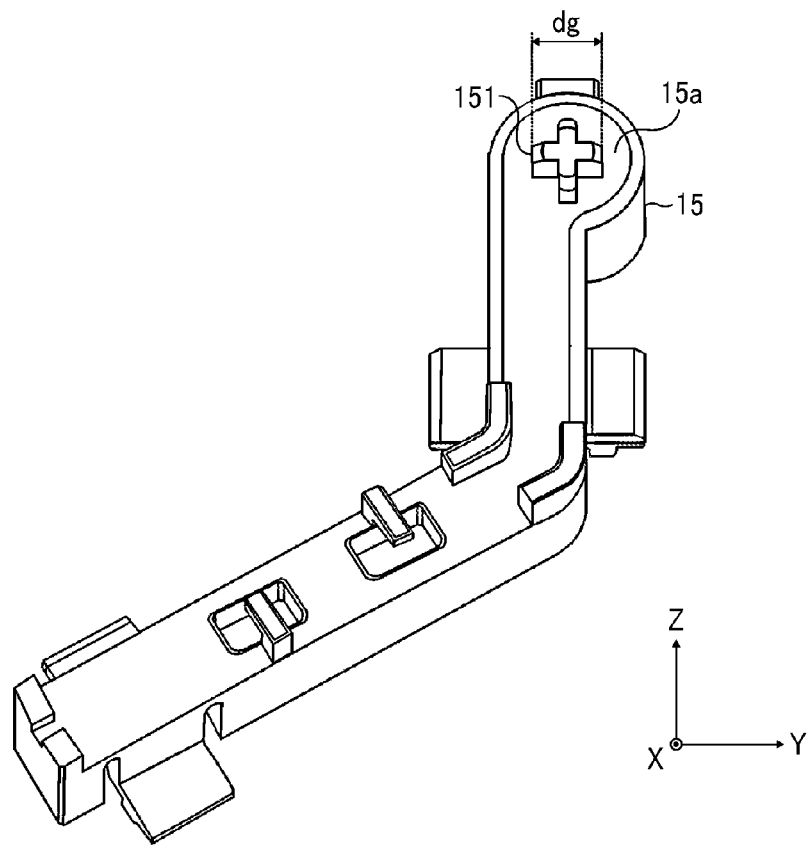
FIG. 5 is a perspective view of a holder incorporated in the spring holder depicted in FIG. 4.

FIG. 5 is a perspective view of the holder 15. As illustrated in FIG. 5, the holder 15 mounts a projection 151 projected from the spring side face 15a of the holder 15, that contacts the spring 12 depicted in FIG. 4. The projection 151 is inserted into a center (e.g., an axis) of the spring 12 and serves as a coupler that couples the holder 15 with the spring 12. The holder 15 is secured to the frame 101 depicted in FIG. 3B. As illustrated in FIG. 4, the holder 15 supports at least the foot 121 and a holder side end of the spring 12, that is disposed opposite the holder 15 in the direction X negatively.

As illustrated in FIG. 5, the projection 151 is cruciform and projects from the spring side face 15a of the holder 15 toward the spring 12 in the direction X positively in FIG. 4. The projection 151 includes a maximum portion that is manufactured with a precision that defines a maximum width dg of 3.7 mm plus-and-minus 0.1 mm.

According to this exemplary embodiment, the projection 151 is a cross having the maximum width dg of 3.7 mm plus-and-minus 0.1 mm in a direction Y positively and negatively. Alternatively, the projection 151 may be tubular, hemispherical, or polygonal.

As illustrated in FIG. 4, the spring 12 includes a resilient portion 122 and an end coil 123. The resilient portion 122 is a compression spring made of a wire wound into a solenoid coil. The end coil 123 is mounted on a holder side end of the resilient portion 122, which is disposed opposite the holder 15 in the direction X negatively.

Figure 6:
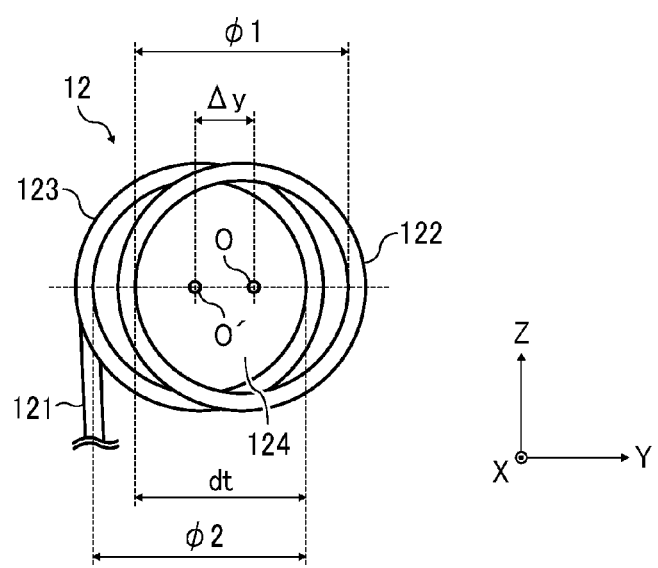
FIG. 6 is a perspective view of a spring incorporated in the spring holder depicted in FIG. 4.

FIG. 6 is a perspective view of the spring 12, illustrating the foot 121, the resilient portion 122, and the end coil 123. As illustrated in FIG. 6, the resilient portion 122 defines the compression spring having an inner diameter φ1, that is, a first diameter, of 4 mm plus-and-minus 0.2 mm about a first central axis O of the resilient portion 122, that is, a hypothetical central axis parallel to the direction X. The end coil 123 defines an end coil having an inner diameter φ2, that is, a second diameter, of 4 mm plus-and-minus 0.2 mm about a second central axis O', that is, a hypothetical central axis being parallel to the first central axis O of the resilient portion 122 and being shifted from the first central axis O of the resilient portion 122 in the direction Y negatively.

The second central axis O' of the end coil 123 is the hypothetical central axis shifted from the first central axis O of the resilient portion 122 by a shift amount Δy of 0.8 mm on a Y-Z plane defined by the directions Y and Z. In other words, the spring 12 includes the resilient portion 122, that is, a body serving as a coil spring and the end coil 123, that is, a shifted portion defined by the hypothetical central axis (e.g., the second central axis O') shifted from the hypothetical central axis (e.g., the first central axis O) of the resilient portion 122. The end coil 123 is shifted from the resilient portion 122 in parallelism with the resilient portion 122 on the Y-Z plane that is perpendicular to the first central axis O of the resilient portion 122.

FIG. 6 illustrates a shape of the end coil 123 and the resilient portion 122 seen in the direction X. As illustrated in FIG. 6, if each of the inner diameter φ1 of the resilient portion 122 and the inner diameter φ2 of the end coil 123 is 4 mm and the second central axis O' of the end coil 123 is shifted from the first central axis O of the resilient portion 122 by the shift amount Δy, an enclosed portion 124 that is enclosed by the resilient portion 122 and the end coil 123 has a minimum width dt of 3.2 mm. In other words, the minimum width dt is an inside dimension obtained by subtracting the shift amount Δy from the inner diameter φ1 of the resilient portion 122. The inside dimension may contain a tolerance of plus-and-minus 0.2 mm.

According to this exemplary embodiment, each of the inner diameter φ1 of the resilient portion 122 and the inner diameter φ2 of the end coil 123 is 4 mm. Alternatively, the inner diameter φ1 of the resilient portion 122 may be different from the inner diameter φ2 of the end coil 123. In this case also, a formula (1) below is preferably satisfied.

$$\varphi 1 - \Delta y < dg < \varphi 2 \tag{1}$$

Figure 7:
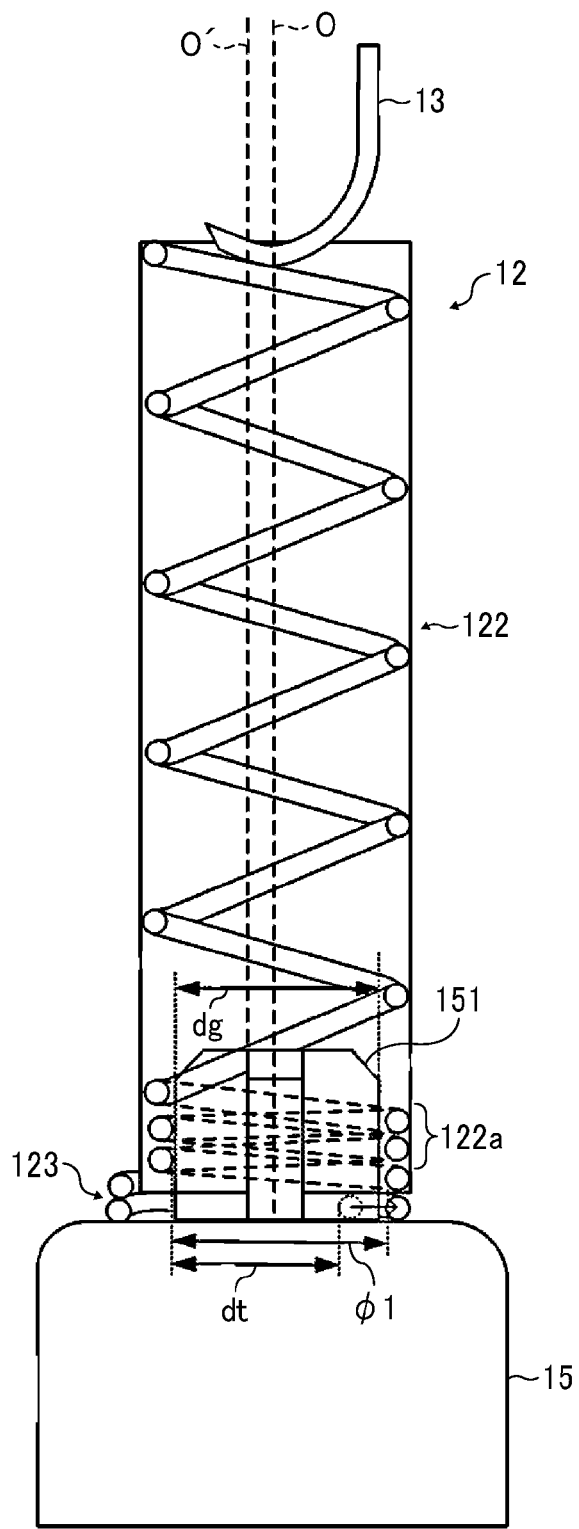
FIG. 7 is a cross-sectional view of the spring depicted in FIG. 6 and the holder depicted in FIG. 5 coupled with the spring.

FIG. 7 is a cross-sectional view of the spring 12 and the holder 15 coupled with the spring 12 and projected on a plane penetrating through the first central axis O of the resilient portion 122. As illustrated in FIG. 7, the resilient portion 122 includes a dense coil portion 122a disposed at one end, that is, the holder side end, of the spring 12 in the direction X negatively. The dense coil portion 122a is made of a wire (e.g., a steel wire) that also constructs the resilient portion 122 and is coiled densely into a tightly packed helix. For example, the dense coil portion 122a is made of the wire coiled densely with two turns or more. According to this exemplary embodiment, the dense coil portion 122a is made of the wire coiled densely with three turns.

The end coil 123 is made of the wire coiled about the second central axis O' densely with two turns or more. One end of the end coil 123 in the direction X positively, that is, a resilient portion side end of the end coil 123, which is disposed opposite the resilient portion 122, joins the resilient portion 122. Another end of the end coil 123 in the direction X negatively, that is, a holder side end of the end coil 123, which is disposed opposite the holder 15, joins the foot 121 depicted in FIG. 4.

A description is provided of attachment of the spring 12 having the construction described above to the holder 15.

As illustrated in FIG. 5, the maximum width dg of the projection 151 is 3.7 mm plus-and-minus 0.1 mm and is smaller than the inner diameter φ1 of the resilient portion 122, that is, the first diameter of the resilient portion 122, of 4 mm. Hence, as illustrated in FIG. 7, the projection 151 is inserted into a center part of the resilient portion 122. The maximum width dg of the projection 151 depicted in FIG. 5 is greater than the minimum width dt of the enclosed portion 124 enclosed by the resilient portion 122 and the end coil 123 depicted in FIG. 6.

Accordingly, as the projection 151 is inserted into a center part of the spring 12, the projection 151 is press-fitted to the spring 12 such that the projection 151 stretches the enclosed portion 124 to widen the minimum width dt of the enclosed portion 124. In other words, as the projection 151 is inserted into the spring 12, a center of the end coil 123 deforms and coincides with the first central axis O of the resilient portion 122. Accordingly, a stress against deformation of the center of the end coil 123 generates as a force directed to sandwich the projection 151. That is, as the resilient portion 122 and the end coil 123 sandwich the projection 151 that is inserted into the spring 12, the spring 12 is coupled with and secured to the holder 15.

A description is provided of a construction of a comparative image forming apparatus.

The comparative image forming apparatus and a moving part of a mechanism such as a suspension of an automobile may include a coil spring. The coil spring may be supported by a holder with an insert inserted into a central axis of the coil spring so that the holder is combined with the coil spring to hold the coil spring. An inner diameter of the coil spring is smaller than an outer diameter of the insert to allow the insert to be press-fitted to the coil spring. However, if the inner diameter of the coil spring is decreased to downsize the comparative image forming apparatus, for example, the inner diameter of the coil spring does not deform readily, rendering the insert to be press-fitted to the coil spring with difficulty.

For example, the comparative image forming apparatus may employ a compression spring that is secured to the holder. An inner diameter ds of the compression spring is smaller than an outer diameter of the insert of the holder to allow the insert to be press-fitted to the compression spring. However, if the compression spring is downsized, a force needed to deform the compression spring may increase, causing press-fitting of the insert to the compression spring to be difficult. Additionally, a tolerance range may increase relative to a dimension of the inner diameter ds of the compression spring, increasing a requested precision of parts.

To address this circumstance of the comparative image forming apparatus, according to this exemplary embodiment, if the first central axis O of the resilient portion 122 is different from the second central axis O' of the end coil 123, the inner diameter φ1 of the resilient portion 122 is not requested to be smaller than the projection 151. If the minimum width dt of the enclosed portion 124 is smaller than the maximum width dg of the projection 151, since the resilient portion 122 and the end coil 123 sandwich the projection 151, the spring 12 is held by the holder 15.

Further, if a formula (2) below is satisfied, the projection 151 having the maximum width dg is inserted into the resilient portion 122 readily, allowing the spring 12 to be coupled with and secured to the holder 15 readily.

$$dt < dg < \varphi 1 \tag{2}$$

Additionally, according to this exemplary embodiment, the inner diameter φ2 of the end coil 123 is equivalent to the inner diameter φ1 of the resilient portion 122. The minimum width dt of the enclosed portion 124 is defined by a formula (3) below.

$$dt = \varphi 1 - \Delta y \tag{3}$$

That is, according to this exemplary embodiment, a formula (4) below is satisfied.

$$\varphi 1 - \Delta y < dg < \varphi 2 \tag{4}$$

Accordingly, while the projection 151 is inserted into the spring 12 readily, the resilient portion 122 and the end coil 123 sandwich the projection 151 to secure the spring 12 to the holder 15. Consequently, even if the spring 12, that is, the body of the coil spring, is downsized to have a decreased diameter, the spring 12 and the holder 15 are assembled readily.

As illustrated in FIG. 6, according to this exemplary embodiment, the spring 12 includes the resilient portion 122 and the end coil 123. The resilient portion 122 has the first central axis O and the inner diameter φ1. The end coil 123 is mounted on one end, that is, the holder side end, of the resilient portion 122 in the direction X. The end coil 123 has the second central axis O' being shifted from the first central axis O of the resilient portion 122 in parallelism with the first central axis O of the resilient portion 122 by the shift amount Δy.

The maximum width dg of the projection 151 depicted in FIG. 5 is smaller than the inner diameter φ1 of the resilient portion 122 and greater than the minimum width dt, that is, the inside dimension obtained by subtracting the shift amount Δy from the inner diameter φ1 of the resilient portion 122. The projection 151 is inserted into the spring 12 in the direction X positively. As illustrated in FIG. 7, as the spring 12 sandwiches the projection 151 mounted on the holder 15, the spring 12 is coupled with and secured to the holder 15. Accordingly, even if the spring 12, that is, the body of the coil spring, is downsized to have the decreased diameter, the spring 12 and the holder 15 are assembled readily.

As illustrated in FIG. 4, according to this exemplary embodiment, the spring 12 includes the foot 121 disposed at one end, that is, the holder side end, of the end coil 123 in the direction X negatively. The holder side end of the end coil 123 is opposite the resilient portion side end of the end coil 123. That is, the foot 121 is disposed opposite the resilient portion 122 via the end coil 123. The foot 121 extends in the direction Z negatively on the Y-Z plane.

An extension direction in which the foot 121 extends is perpendicular to a line connecting the first central axis O of the resilient portion 122 to the second central axis O' of the end coil 123. In other words, the extension direction of the foot 121 is perpendicular to a shift direction in which the second central axis O' of the end coil 123 is shifted from the first central axis O of the resilient portion 122 in parallelism with the first central axis O of the resilient portion 122 by the shift amount Δy.

Accordingly, as the foot 121 tilts and bends, the foot 121 absorbs displacement of the spring 12 readily when the projection 151 is inserted into and press-fitted to the spring 12. Consequently, as the projection 151 is inserted into the spring 12, the end coil 123 deforms readily in a displacement direction in which the spring 12 is displaced, thus reducing a force used to secure the spring 12 to the holder 15.

As illustrated in FIG. 7, according to this exemplary embodiment, the end coil 123 is made of the wire coiled densely with two turns or more. Additionally, one end of the resilient portion 122 in the direction X negatively, that is, the dense coil portion 122a of the resilient portion 122, is made of the wire coiled densely with two turns or more.

A detailed description is now given of coiling of the resilient portion 122 and the end coil 123.

FIG. 8A is a cross-sectional view of a spring holder 10' as a comparative spring holder including a spring 12' and a tip portion 13'. As illustrated in FIG. 8A, the spring 12' includes an end coil 123' made of a wire coiled densely with one turn and a resilient portion 122' made of no wire coiled densely. The spring holder 10' depicted in FIG. 8A has a simple structure. However, when the spring 12' is exerted with an external force that deforms the spring 12' in the direction Y or the direction Z, the spring 12' is susceptible to deformation as illustrated in FIG. 8B. FIG. 8B is a cross-sectional view of the spring holder 10', illustrating deformation of the spring 12'. If the spring 12' tilts in the direction Y or the direction Z, the spring 12' may not transmit a force (e.g., a resilience) readily in the direction X positively and negatively.

To address this circumstance, according to this exemplary embodiment, as illustrated in FIG. 7, at least one end, that is, the holder side end, of each of the end coil 123 and the resilient portion 122 in the direction X negatively is made of the wire coiled densely with two turns or more. Accordingly, the projection 151 supports each of the end coil 123 and the resilient portion 122 of the spring 12 at a plurality of contacts where the projection 151 contacts each of the end coil 123 and the resilient portion 122, thus preventing the spring 12 from deforming and tilting in the direction Y or the direction Z.

According to this exemplary embodiment, at least one end, that is, the holder side end, of each of the end coil 123 and the resilient portion 122 in the direction X negatively is made of the wire coiled densely with two turns or more. Alternatively, one of the end coil 123 and the resilient portion 122 may be made of the wire coiled densely.

Since a portion of the spring 12, which contacts the projection 151, preferably suppresses tilting of the spring 12, the end coil 123 is preferably made of the wire coiled densely with two turns or more.

The present disclosure is not limited to the details of the exemplary embodiments described above and various modifications and improvements are possible.

For example, according to the exemplary embodiments described above, the spring holders 10 depicted in FIG. 3B are used as the contacts that couple the power supply with the chargers 43Y, 43C, 43M, and 43K depicted in FIG. 1 to create a part of the power supply paths, respectively. Alternatively, the spring holder 10 may be used as other machine part.

Further, according to the exemplary embodiments described above, as illustrated in FIG. 6, the second central axis O' of the end coil 123 is shifted from the first central axis O of the resilient portion 122 in the direction Y negatively in parallelism with the first central axis O of the resilient portion 122. Alternatively, the second central axis O' of the end coil 123 may be shifted from the first central axis O of the resilient portion 122 in other direction.

A description is provided of advantages of a coil spring (e.g., the spring 12).

As illustrated in FIG. 7, the coil spring includes a resilient portion (e.g., the resilient portion 122), an end coil (e.g., the end coil 123), and a coupler (e.g., the projection 151).

As illustrated in FIG. 6, the resilient portion has a first diameter (e.g., inner diameter φ1) defined by a first central axis (e.g., the first central axis O). As illustrated in FIG. 7, the end coil abuts on one end of the resilient portion in an axial direction of the resilient portion. As illustrated in FIG. 6, the end coil has a second central axis (e.g., the second central axis O') being shifted from the first central axis of the resilient portion in parallelism with the first central axis of the resilient portion by a predetermined shift amount (e.g., the shift amount Δy). As illustrated in FIG. 7, the coupler has a first width (e.g., the maximum width dg) that is smaller than the first diameter of the resilient portion and greater than a second width (e.g., the minimum width dt) obtained by subtracting the predetermined shift amount from the first diameter of the resilient portion. The coupler is inserted into the end coil to secure the end coil to the coupler.

Accordingly, the coil spring facilitates assembly of the end coil on the coupler.

The advantages achieved by the exemplary embodiments described above are examples and therefore are not limited to those described above.

The above-described embodiments are illustrative and do not limit the present disclosure. Thus, numerous additional modifications and variations are possible in light of the above teachings. For example, elements and features of different illustrative embodiments may be combined with each other and substituted for each other within the scope of the present invention.

Any one of the above-described operations may be performed in various other ways, for example, in an order different from the one described above.

What is claimed is:

1. A coil spring comprising:
   a resilient portion having a first diameter defined by a first central axis that is hypothetical;
   an end coil abutting on one end of the resilient portion in an axial direction of the resilient portion, the end coil having a second diameter defined by a second central axis that is hypothetical and shifted from the first central axis of the resilient portion in parallelism with the first central axis of the resilient portion by a predetermined shift amount; and
   a coupler having a first width that is smaller than the first diameter of the resilient portion and greater than a second width obtained by subtracting the predetermined shift amount from the first diameter of the resilient portion, the coupler being inserted into the end coil to secure the end coil to the coupler.

2. The coil spring according to claim 1, further comprising:
   a foot being disposed opposite the resilient portion via the end coil and extending on a plane perpendicular to the second central axis of the end coil.

3. The coil spring according to claim 2,
   wherein the second central axis of the end coil is shifted from the first central axis of the resilient portion in a shift direction perpendicular to an extension direction in which the foot extends.

4. The coil spring according to claim 2,
   wherein the foot includes:
   a linear portion extending linearly; and
   a tilt portion extending linearly from the linear portion and being tilted relative to the linear portion by a predetermined angle.

5. The coil spring according to claim 1,
   wherein the end coil is made of a wire coiled densely with at least two turns.

6. The coil spring according to claim 1,
wherein the resilient portion includes a dense coil portion disposed at the one end of the resilient portion in the axial direction of the resilient portion, the dense coil portion being made of a wire coiled densely with at least two turns.

7. The coil spring according to claim 1,
wherein the coupler includes a projection.

8. The coil spring according to claim 1, further comprising:
an enclosed portion enclosed by the resilient portion and the end coil, the enclosed portion having the second width.

9. The coil spring according to claim 1,
wherein the first width of the coupler is greater than the second width and smaller than the second diameter of the end coil.

10. A coil spring holder comprising:
a coil spring including:
  a resilient portion having a first diameter defined by a first central axis that is hypothetical;
  an end coil abutting on one end of the resilient portion in an axial direction of the resilient portion, the end coil having a second diameter defined by a second central axis that is hypothetical and shifted from the first central axis of the resilient portion in parallelism with the first central axis of the resilient portion by a predetermined shift amount; and
  a coupler having a first width that is smaller than the first diameter of the resilient portion and greater than a second width obtained by subtracting the predetermined shift amount from the first diameter of the resilient portion, the coupler being sandwiched by the resilient portion and the end coil to secure the resilient portion and the end coil to the coupler; and
a holder mounting the coupler of the coil spring to support the coil spring.

11. The coil spring holder according to claim 10,
wherein the coupler includes a projection that is cruciform and projects from the holder toward the end coil.

12. The coil spring holder according to claim 10, further comprising:
a cover covering the coil spring; and
a tip portion mounted on a tip of the coil spring.

13. The coil spring holder according to claim 10,
wherein the coil spring includes a compression spring.

14. An image forming apparatus comprising:
a charger; and
a coil spring holder to contact the charger, the coil spring holder including:
  a coil spring including:
    a resilient portion having a first diameter defined by a first central axis that is hypothetical;
    an end coil abutting on one end of the resilient portion in an axial direction of the resilient portion, the end coil having a second diameter defined by a second central axis that is hypothetical and shifted from the first central axis of the resilient portion in parallelism with the first central axis of the resilient portion by a predetermined shift amount; and
    a coupler having a first width that is smaller than the first diameter of the resilient portion and greater than a second width obtained by subtracting the predetermined shift amount from the first diameter of the resilient portion, the coupler being sandwiched by the resilient portion and the end coil to secure the resilient portion and the end coil to the coupler; and
  a holder mounting the coupler of the coil spring to support the coil spring.

15. The image forming apparatus according to claim 14, further comprising:
a frame mounting the coil spring holder,
wherein the coil spring holder further includes:
  a cover covering the coil spring; and
  a tip portion mounted on a tip of the coil spring, the tip portion to contact the charger.

* * * * *